US007073068B2

(12) United States Patent
Jakobsson et al.

(10) Patent No.: US 7,073,068 B2
(45) Date of Patent: Jul. 4, 2006

(54) METHOD AND APPARATUS FOR DISTRIBUTING SHARES OF A PASSWORD FOR USE IN MULTI-SERVER PASSWORD AUTHENTICATION

(75) Inventors: Bjorn Markus Jakobsson, Hoboken, NJ (US); Philip D MacKenzie, Maplewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 826 days.

(21) Appl. No.: 10/154,746

(22) Filed: May 24, 2002

(65) Prior Publication Data

US 2003/0229788 A1    Dec. 11, 2003

(51) Int. Cl.
*G06F 1/26* (2006.01)
(52) U.S. Cl. .................. 713/184; 713/200; 713/201
(58) Field of Classification Search ................ 713/184, 713/200, 201
See application file for complete search history.

(56) References Cited

U.S. PATENT DOCUMENTS

| | | | | |
|---|---|---|---|---|
| 4,200,770 | A |   | 4/1980 | Hellman et al. ............... 178/22 |
| 5,406,628 | A | * | 4/1995 | Beller et al. ................... 380/30 |
| 5,491,750 | A | * | 2/1996 | Bellare et al. ............... 713/155 |
| 5,517,567 | A | * | 5/1996 | Epstein ........................ 380/247 |
| 5,761,305 | A | * | 6/1998 | Vanstone et al. ........... 713/171 |
| 6,226,383 | B1 |   | 5/2001 | Jablon ........................... 380/30 |
| 6,292,896 | B1 | * | 9/2001 | Guski et al. ................. 713/169 |

OTHER PUBLICATIONS

U.S. Appl. No. 09/827,227, filed Apr. 5, 2001, MacKenzie et al.
U.S. Appl. No. 09/638,320, filed Aug. 14, 2000, Boyko et al.
U.S. Appl. No. 09/353,468, filed Jul. 13, 1999, MacKenzie.
Bellare, M. et al., *Authenticated Key Exchange Secure Against Dictionary Attacks*, Eurocrypt 2000, (LNCS 1807), pp. 139-155.
Bellare, M. et al, *Random Oracles are Practical: A Paradigm for Designing Efficient Protocols*. Conference on Computer and Communications Security, Nov. 1993, pp. 62-73.
Boneh, D., *The Decision Diffie-Hellman Problem*. Proceedings of the Third Algorithmic Number Theory Symposium, (LNCS 1423), 1998, pp. 46-63.
Boyd, C., *Digital Mulitignatures*, Cryptography and Coding, Clarendon Press, 1986, pp. 241-246.

(Continued)

*Primary Examiner*—Thomas R. Peeso
(74) *Attorney, Agent, or Firm*—Kenneth M. Brown

(57) ABSTRACT

A method for distributing a password amongst a plurality of servers for subsequent use in a provably secure multi-server threshold password authentication process. A client, having a password to be authenticated by a plurality of servers, generates an encryption of a function of the password. Then, this encryption is provided to each of the servers for use in subsequent password authentication. In accordance with one illustrative embodiment of the invention, the encryption is of an ElGamal ciphertext of the function $g^{(\pi_C)^{-1}}$, where $\pi_C$ is password and g is the generator used to generate the cryptographic keys used for communication between the client and the plurality of servers.

10 Claims, 10 Drawing Sheets

OTHER PUBLICATIONS

Desmedt, Y. et al, *Threshold Cryptosystems*, CRYPTO, 1989, (LNCS 435), pp. 307-315.

ElGamal, T., *A Public Key Cryptosystem And A Signature Scheme Based On Discrete Logarithms*, IEEE Trans. Info. Theory, pp. 31:469-472, 1985.

Feldman, P., *A Practical Scheme for Non-Interactive Verifiable Secret Sharing*, 28th IEEE Symp. On Foundations of Computer Science, 1987, pp. 427-437.

Ford, W. et al., *Server-Assisted Generation of a Strong Secret from a Password*, 5th IEEE International Workshop on Enterprise Security, 2000.

Wu, T., *The Secure Remote Password Protocol*, Internet Society Symposium on Network and Distributed System Security, 1998, pp. 1-17.

Jablon, D.P., *Extended Password Key Exchange Protocols Immune to Dictionary Attack*, WETICE '97 Workshop on Enterprise Security, Cambridge, MA, Jun. 1997, pp. 1-8.

Katz, J. et al., *Efficient Password-Authenticated Key Exchange Using Human-Memorable Passwords*, Cryptology E-print Archive, http://eprint.lacr.org/2001/031, 2001.

Blum, M. et al., Noninteractive Zero-Knowledge, Siam Journal on Computing, vol. 20, No. 6, Dec. 1991, pp. 1084-1118.

Gennaro, R. et al., *Robust Threshold DDS Signatures*, Eurocrypt 1996, (LNCS 1070), pp. 354-371.

Goldreich, O. et al., *Session-Key Generation Using Human Passwords Only*, Crypto 2001, pp. 408-432, 2001.

Jablon, D.P., *Strong Password-Only Authenticated Key Exchange*, ACM Computer Communication Review, ACM Sigcomm. 1996, pp. 5-20.

Jablon, D.P., *Password Authentication Using Multiple Servers*, In em RSA Conferance 2001, Cryptographers Track, (LNCS 2020), pp. 344-360.

Halevi, S., et al., *Public-Key Cryptography and Password Protocols*, 5th ACM Conference on Computer and Communications Security, 1998, pp. 122-131.

* cited by examiner

FIG. 5

Client C                                                     Server $S_i$ ($i \in I$)

$$C, I = \langle i_1, \ldots, i_k \rangle$$
$$\xrightarrow{\hspace{4cm}}$$

$$c_i \xleftarrow{R} \mathbb{Z}_q$$
$$Broadcast: c_i$$

$$\{c_i\}_{i \in I}$$
$$\xleftarrow{\hspace{4cm}}$$

$\tilde{x}, \beta, \gamma \xleftarrow{R} \mathbb{Z}_q$
$\tilde{y} \leftarrow g^{\tilde{x}}$
$B \leftarrow (y^\beta, g^\beta) \times (E_C)^\pi \times (g^{-1}, 1)$
$V \leftarrow (h^\gamma g^\pi, g^\gamma)$
$\tau \leftarrow \langle \tilde{y}, c_{i_1}, \ldots, c_{i_k} \rangle$
$\sigma \leftarrow \text{PROVE}_{\phi_Q}((\tau, E_C, B, V), (\beta, \pi, \gamma))$ $\forall i \in I, \tilde{y}_i \leftarrow (y_i')^{\tilde{x}}$
$\forall i \in I, K_i \leftarrow H_2(I, \tau, \tilde{y}_i)$ $$B, V, \tilde{y}, \sigma$$
$$\xrightarrow{\hspace{4cm}}$$

$\tau \leftarrow \langle \tilde{y}, c_{i_1}, \ldots, c_{i_k} \rangle$
If $\neg$ Verify$_{\phi_Q}((\tau, E_C, B, V), \sigma)$ THEN ABORT
DistVerify$(\tau, B, V)$
$\tilde{y}_i \leftarrow \tilde{y}^{x_i}$
$K_i \leftarrow H_2(I, \tau, \tilde{y}_i)$

FIG. 6

Server $S_i$ ($i \in I$)
Step 1:
$r_i, r'_i, \gamma_i, \gamma'_i, \gamma''_i \xleftarrow{R} \mathbb{Z}_q$
$B_i \leftarrow B^{r_i} \times (y, g)^{r'_i}$
$V_i \leftarrow (h^{\gamma_i} g^{r_i}, g^{\gamma_i})$
$V'_i \leftarrow (h^{\gamma'_i} (V[1])^{r_i}, g^{\gamma'_i})$
$V''_i \leftarrow (h^{\gamma''_i} (V[2])^{r_i}, g^{\gamma''_i})$
$\sigma_i \leftarrow \text{PROVE}_{\phi_\mathcal{R}} ((i, B, V, B_i, V_i, V'_i, V''_i), (r_i, r'_i, \gamma_i, \gamma'_i, \gamma''_i))$
Broadcast: $(B_i, V_i, V'_i, V''_i, \sigma_i)$ Step 2:
$\forall j \in I \setminus \{i\}$ : Receive $(B_j, V_j, V'_j, V''_j, \sigma_j)$
$\forall j \in I \setminus \{i\}$ : If $\neg \text{Verify}_{\phi_\mathcal{R}}((j, B, V, B_j, V_j, V'_j, V''_j), \sigma_j)$ THEN ABORT
$(\bar{y}, \bar{g}) \leftarrow \prod_{j \in I} B_j$
$\tau' \leftarrow \langle \tau, B, V, B_{i_1}, \ldots, B_{i_k} \rangle$
$a_i \leftarrow \lambda_{i, I} x_i$
$\bar{C}_i \leftarrow \bar{g}^{a_i}$
$R_i \leftarrow (h^\zeta (h')^{a_i}, g^\zeta)$
$\forall j \in I : C_j \leftarrow (y_j)^{\lambda_{i, I}}$
$\Gamma_i \leftarrow \text{PROVE}_{\phi_\mathcal{S}} ((i, \tau', C_i, R_i), a_i)$
Broadcast: $(R_i, \Gamma_i)$ Step 3:
$\forall j \in I \setminus \{i\}$ : Receive $(R_j, \Gamma_j)$
$\forall j \in I \setminus \{i\}$ : If $\neg \text{Verify}_{\phi_\mathcal{S}} ((j, \tau', C_j, R_j), \Gamma_j)$ THEN ABORT
$\Gamma'_i \leftarrow \text{PROVE}_{\phi_\mathcal{T}} ((i, \tau', \bar{g}, \bar{C}_i, C_i, R_i), a_i)$
Broadcast: $(\bar{C}_i, \Gamma'_i)$ Step 4:
$\forall j \in I \setminus \{i\}$ : Receive $(\bar{C}_j, \Gamma'_j)$
$\forall j \in I \setminus \{i\}$ : If $\neg \text{Verify}_{\phi_\mathcal{T}} ((j, \tau', \bar{g}, \bar{C}_j, C_j, R_j), \Gamma'_j)$ THEN ABORT
If $\prod_{j \in I} \bar{C}_j \neq \bar{y}$ THEN ABORT DistVerify $(\tau, B, V)$

FIG. 7

$$\mu_1, \mu_2, \nu \xleftarrow{R} \mathbb{Z}_q$$
$$B' \leftarrow (y^{\mu_1}, g^{\mu_1}) \times (E_C)^{\mu_2}$$
$$V' \leftarrow (h^\nu g^{\mu_2}, g^\nu)$$
$$e \leftarrow H(\tau, E_C, B, V, B', V')$$
$$z_1 \leftarrow \beta e + \mu_1 \bmod q$$
$$z_2 \leftarrow \pi e + \mu_2 \bmod q$$
$$z_3 \leftarrow \gamma e + \nu \bmod q$$

$$\sigma \leftarrow (e, z_1, z_2, z_3)$$
RETURN $\sigma$ $\text{PROVE}_{\phi_\mathcal{Q}}((\tau, E_C, B, V), (\beta, \pi, \gamma))$

FIG. 8

$$B' \leftarrow (y^{z_1}, g^{z_1}) \times (E_C)^{z_2} \times (B \times (g, 1))^{-e}$$
$$V' \leftarrow (h^{z_3} g^{z_2}, g^{z_3}) \times V^{-e}$$
Return TRUE if $e = H(\tau, E_C, B, V, B', V')$ $\text{VERIFY}_{\phi_\mathcal{Q}}((\tau, E_C, B, V), (e, z_1, z_2, z_3))$

FIG. 9

$$\mu_1, \mu_2, \nu_1, \nu_2, \nu_3, \xleftarrow{R} \mathbb{Z}_q$$
$$\tilde{B}_i \leftarrow B^{\mu_1} \times (y^{\mu_2}, g^{\mu_2})$$
$$\tilde{V}_i \leftarrow (h^{\nu_1} g^{\mu_1}, g^{\nu_1})$$
$$\tilde{V}'_i \leftarrow (h^{\nu_2} (V[1])^{\mu_1}, g^{\nu_2})$$
$$\tilde{V}''_i \leftarrow (h^{\nu_3} (V[2])^{\mu_1}, g^{\nu_3})$$
$$e \leftarrow H(i, B, V, B_i, V_i, V'_i, V''_i, \tilde{B}_i, \tilde{V}_i, \tilde{V}'_i, \tilde{V}''_i)$$
$$z_1 \leftarrow r_i e + \mu_1 \bmod q$$
$$z_2 \leftarrow r'_i e + \mu_2 \bmod q$$
$$z_3 \leftarrow \gamma_i e + \nu_1 \bmod q$$
$$z_4 \leftarrow \gamma'_i e + \nu_2 \bmod q$$
$$z_5 \leftarrow \gamma''_i e + \nu_3 \bmod q$$

$$\sigma \leftarrow (e, z_1, z_2, z_3, z_4, z_5)$$
RETURN $\sigma$

PROVE$_{\Phi_\mathcal{R}}((i, B, V, B_i, V_i, V'_i, V''_i), (r_i, r'_i, \gamma_i, \gamma'_i, \gamma''_i))$

FIG. 10

$$\tilde{B}_i \leftarrow B^{z_1} \times (y^{z_2}, g^{z_2}) \times (B_i)^{-e}$$
$$\tilde{V}_i \leftarrow (h^{z_3} g^{z_1}, g^{z_3}) \times (V_i)^{-e}$$
$$\tilde{V}'_i \leftarrow (h^{z_4} (V[1])^{z_1}, g^{z_4}) \times (V'_i)^{-e}$$
$$\tilde{V}''_i \leftarrow (h^{z_5} (V[2])^{z_1}, g^{z_5}) \times (V''_i)^{-e}$$
Return TRUE if $e = H(i, B, V, B_i, V_i, V'_i, V''_i, \tilde{B}_i, \tilde{V}_i, \tilde{V}'_i, \tilde{V}''_i)$ VERIFY$_{\Phi_\mathcal{R}}((i, B, V, B_i, V_i, V'_i, V''_i), (e, z_1, z_2, z_3, z_4, z_5))$

FIG. 11

$$\mu, \nu \xleftarrow{R} \mathbb{Z}_q$$
$$W \leftarrow g^\mu$$
$$R' \leftarrow (h^\nu (h')^\mu, g^\nu)$$
$$e \leftarrow H(i, \tau', C_i, R_i, W, R')$$
$$z_1 \leftarrow ae + \mu \bmod q$$
$$z_2 \leftarrow \gamma e + \nu \bmod q$$
$$\Gamma_i \leftarrow (e, z_1, z_2)$$
RETURN $\Gamma_i$ PROVE$_{\phi_S}((i, \tau', C_i, R_i), (a, \gamma))$

FIG. 12

$$(e, z_1, z_2) \leftarrow \Gamma_i$$
$$R' \leftarrow (h^{z_2}(h')^{z_1}(R_i[1])^{-e}, g^{z_2}(R_i[2])^{-e})$$
$$W \leftarrow g^{z_1}(C_i)^{-e}$$

VERIFY $e = H(i, \tau', C_i, R_i, W, R')$

VERIFY$_{\phi_S}((i, \tau', C_i, R_i), \Gamma_i)$

FIG. 13

$$\mu, \nu \xleftarrow{R} \mathbb{Z}_q$$
$$\bar{W} \leftarrow \bar{g}^\mu$$
$$W \leftarrow g^\mu$$
$$R' \leftarrow (h^\nu (h')^\mu, g^\nu)$$
$$e \leftarrow H(i, \tau', \bar{g}, \bar{C}_i, C_i, R_i, \bar{W}, W, R')$$
$$z_1 \leftarrow \alpha e + \mu \bmod q$$
$$z_2 \leftarrow \gamma e + \nu \bmod q$$
$$\Gamma'_i \leftarrow (e, z_1, z_2)$$
RETURN $\Gamma'_i$ PROVE$_{\phi_T}((i, \tau', \bar{g}, \bar{C}_i, C_i, R_i), (\alpha, \gamma))$

FIG. 14

$$(e, z_1, z_2) \leftarrow \Gamma'_i$$

$$R' \leftarrow (h^{z_2} (h')^{z_1} (R_i[1])^{-e}, g^{z_2} (R_i[2])^{-e})$$
$$\bar{W} \leftarrow \bar{g}^{z_1} (\bar{C}_i)^{-e}$$
$$W \leftarrow g^{z_1} (C_i)^{-e}$$

VERIFY $e = H(i, \tau', \bar{g}, \bar{C}_i, C_i, R_i, \bar{W}, W, R')$

VERIFY$_{\phi_T}((i, \tau', \bar{g}, \bar{C}_i, C_i, R_i), \Gamma'_i)$

METHOD AND APPARATUS FOR DISTRIBUTING SHARES OF A PASSWORD FOR USE IN MULTI-SERVER PASSWORD AUTHENTICATION

CROSS-REFERENCE TO RELATED APPLICATION

The subject matter of this application is related to the subject matter of the U.S. Patent application of B. Jakobsson, P. MacKenzie and T. Shrimpton, entitled "Method and Apparatus for Performing Multi-Server Threshold Password-Authenticated Key Exchange," Ser. No. 10/154,663, filed on even date herewith and commonly assigned to the assignee of the present invention.

FIELD OF THE INVENTION

The present invention relates generally to techniques for providing network authentication, and, more particularly, to a method and apparatus for distributing shares (i.e., portions) of a password to a plurality of servers for subsequent use in performing password authentication using a plurality of servers.

BACKGROUND OF THE INVENTION

Many real-world systems today rely on password authentication to verify the identity of a user before allowing that user to perform certain functions, such as setting up a virtual private network or downloading secret information. There are many security concerns associated with password authentication, due to the fact that the leakage of information to unscrupulous eavesdroppers can compromise the process, potentially resulting in drastic consequences.

When password authentication is performed over a network, one must be especially careful not to allow any leakage of information to one listening in, or even actively attacking, the network. Authentication over a network is an important part of security for systems that allow remote clients to access network servers, and is generally accomplished by verifying one or more of the following:

(i) something a user knows, e.g. a password;
(ii) something a user is, i.e., biometric information, such as a fingerprint; and
(iii) something a user has, i.e., some identification token, such as a smart-card.

For example, an automatic teller machine (ATM) verifies two of these: something a user has, the ATM card, and something a user knows, a personal identification number (PIN). ATM authentication is significantly easier than authentication over a data network because the ATM itself is considered trusted hardware, such that it is trusted to verify the presence of the ATM card and to transfer the correct information securely to a central transaction server.

In addition to authentication, key exchange is an important part of communication across a data network. Once a client and server have been authenticated, a secure communication channel must be set up between them. This is generally accomplished by the client and server exchanging a key, called a session key, for use during communication subsequent to authentication.

Authentication over a data network, especially a public data network like the Internet, is difficult because the communication between the client and server is susceptible to many different types of attacks. For example, in an eavesdropping attack, an adversary may learn secret information by intercepting communication between the client and the server. If the adversary learns password information, the adversary may replay that information to the server to impersonate the legitimate client in what is called a replay attack. Replay attacks are effective even if the password sent from the client is encrypted because the adversary does not need to know the actual password, but instead must provide something to the server that the server expects from the legitimate client (in this case, an encrypted password). Another type of attack is a spoofing attack, in which an adversary impersonates the server, so that the client believes that it is communicating with the legitimate server, but instead is actually communicating with the adversary. In such an attack, the client may provide sensitive information to the adversary.

Further, in any password-based authentication protocol, there exists the possibility that passwords will be weak such that they are susceptible to dictionary attacks. A dictionary attack is a brute force attack on a password that is performed by testing a large number of likely passwords (e.g., all the words in an English dictionary) against some known information about the desired password. The known information may be publicly available or may have been obtained by the adversary through one of the above-described techniques. Dictionary attacks are often effective because users often choose easily remembered, and easily guessed, passwords. Thus, a network authentication technique should have the following property with respect to an active attacker or adversary (i.e., one that may eavesdrop on, insert, delete, or modify messages on a network) who iteratively guesses passwords and runs the authentication protocol: the probability of such an attacker successfully impersonating a user is no better (or at most negligibly better) than it would be if the adversary engaged in a simple on-line guessing attack.

There are various known techniques for network authentication. Some of these techniques require the client to store the public key of the authentication server, including those where the protocol consists of sending a password over a previously secured web connection, such as is done in the well-known TLS Protocol standard (fully familiar to those of ordinary skill in the art), or in the Halevi-Krawczyk protocol, described in S. Halevi and H. Krawczyk, "*Public-Key Cryptography and Password Protocols,*" 5th ACM Conference on Computer and Communications Security, pp. 122–131, 1998, whose disclosure is incorporated by reference herein. (Note that the Halevi-Krawczyk protocol is provably secure against the type of attacker described above.)

Other techniques do not require the client to store a public key of the authentication server. These include, for example, those described in D. Jablon, *Strong Password-Only Authenticated Key Exchange*, ACM Computer Communication Review, ACM SIGCOMM, 26(5):5–20, 1996, and in T. Wu, *The Secure Remote Password Protocol,* 1998 Internet Society Symposium on Network and Distributed System Security, 1998, the disclosures of which are incorporated by reference herein. In addition, the following references also describe such protocols, and moreover, each of these protocols has been proven to be secure against the attacker described above: M. Bellare, D. Pointcheval, and P. Rogaway, *Authenticated Key Exchange Secure Against Dictionary Attacks*, Eurocrypt 2000, pp. 139–155, 2000 (hereinafter, "Bellare et al."); commonly assigned U.S. patent application identified by Ser. No. 09/353,468, filed on Jul. 13, 1999 in the name of P. MacKenzie et al. and entitled "Secure Mutual Network Authentication Protocol (SNAPI)"; commonly assigned U.S. patent application identified by Ser. No. 09/638,320, filed on Aug. 14, 2000 in the name of V. V. Boyko et al. and entitled "Secure Mutual Network Authentication and Key Exchange Protocol"; commonly assigned U.S. patent application identified by Ser. No. 09/827,227, filed on Apr. 5, 2001 in the name of P. MacKenzie and entitled "Methods And Apparatus For Providing Efficient Password-Authenticated Key Exchange"; J. Katz, R. Ostrovsky and M. Yung, *Efficient Password-Authenticated Key Exchange Using Human-Memorable Passwords*, Cryptology Eprint Archive, http:H/eprint.iacr.org/2001/031, 2001 (expanded version of J. Katz, R. Ostrovsky and M. Yung, *Practical Password-Authenticated Key Exchange Provably Secure Under Standard Assumptions*, Eurocrypt 2001, pp. 475–494, 2001); and O. Goldreich and Y. Lindell, *Session-Key Generation Using Human Passwords Only*, CRYPTO 2001, pp. 408–432, 2001. The disclosures of each of these references is also incorporated by reference herein.

However, all of these protocols, even the ones in which the server's public key is known to the user, are vulnerable to server compromise in the sense that compromising the server would allow an attacker to obtain the password verification data on that server (typically some type of one-way function of the password and some public values). This could then be used to perform an offline dictionary attack on the password. To address this issue (without resorting to assumptions such as, for example, tamper resistance), in W. Ford and B. S. Kaliski, Jr., *Server-Assisted Generation of a Strong Secret from a Password*, Proceedings of the 5th IEEE International Workshop on Enterprise Security, 2000 (hereinafter, "Ford and Kaliski"), the disclosure of which is incorporated by reference herein, it was suggested that the functionality of the server be distributed, thereby forcing an attacker to compromise multiple servers in order to be able to obtain password verification data. (As is well-known in the practice of distributed cryptography, for high security one should be careful to ensure that it is not easy for an attacker to compromise several servers with the same attack, which may be the case, for example, if they are all running the same operating system.) Note that the main problem in such an approach is not merely to distribute the password verification data, but to distribute the functionality, i.e., to distribute the password verification data such that it can be used for authentication without ever reconstructing the data on any one or more (but less than all) of the required servers.

While multiple party cryptosystems have been studied extensively (and many proven secure) for other cryptographic operations, such as signatures (see, e.g., Y. Desmedt and Y. Frankel, *Threshold Cryptosystems*, CRYPTO 1989, pp. 307–315, 1989, the disclosure of which is incorporated by reference herein), multi-server password-authenticated key exchange systems have no such history prior to the system disclosed in Ford and Kaliski. In D. Jablon, *Password Authentication Using Multiple Servers*, RSA Conference 2001, Cryptographers' Track, pp. 344–360, 2001 (hereinafter "Jablon"), the disclosure of which is also incorporated by reference herein, the system of Ford and Kaliski is extended, most notably so as not to require the server's public key to be known to the user.

However, neither the protocol of Ford and Kaliski nor the protocol of Jablon have been proven secure. Moreover, each of these prior art multi-server password authentication systems require the participation of each and every one of the servers in order to authenticate a client's password. While this makes it likely that the compromise of less than all of the servers will fail to compromise the client's password, it also fails to allow password authentication from taking place at all when any of the servers are unavailable (for whatever reason).

SUMMARY OF THE INVENTION

In accordance with certain illustrative embodiments of the present invention, a novel method for distributing a password amongst a plurality of servers for subsequent use in a provably secure multi-server threshold password authentication process is provided. In particular, a client, having a password to be authenticated by a plurality of servers, initially generates an encryption of a function of the password. Then, this encryption is provided to each of the servers for use in subsequent password authentication. In accordance with one illustrative embodiment of the invention, the encryption is of an ElGamal ciphertext of the function $g^{(\pi_C)^{-1}}$, where $\pi_C$ is the password and g is the generator used to generate the cryptographic keys used for communication between the client and the plurality of servers. In accordance with another illustrative embodiment of the invention, the encryption is of the password, $\pi_C$, itself (i.e., the encryption is of the identity function applied to the password).

BRIEF DESCRIPTION OF THE DRAWINGS

FIG. 5 shows the detailed operation of the illustrative client login protocol in accordance with the illustrative embodiment of the present invention shown in FIGS. 3 and 4.

FIG. 6 shows the detailed operation of the function $Prove_{\Phi_Q}$ in accordance with the illustrative client login protocol of the present invention shown in FIG. 5.

FIG. 7 shows the detailed operation of the function $Verify_{\Phi_Q}$ in accordance with the illustrative client login protocol of the present invention shown in FIG. 5.

FIG. 8 shows the detailed operation of the function DistVerify in accordance with the illustrative client login protocol of the present invention shown in FIG. 5.

FIG. 9 shows the detailed operation of the function $Prove_{\Phi_R}$ in accordance with the illustrative client login protocol of the present invention shown in FIG. 5.

FIG. 10 shows the detailed operation of the function $Verify_{\Phi_R}$ in accordance with the illustrative client login protocol of the present invention shown in FIG. 5.

FIG. 11 shows the detailed operation of the function $Prove_{\Phi_S}$ in accordance with the illustrative client login protocol of the present invention shown in FIG. 5.

FIG. 12 shows the detailed operation of the function $Verify_{\Phi_S}$ in accordance with the illustrative client login protocol of the present invention shown in FIG. 5.

FIG. 13 shows the detailed operation of the function Prove$_{\Phi_T}$ in accordance with the illustrative client login protocol of the present invention shown in FIG. 5.

FIG. 14 shows the detailed operation of the function Verify$_{\Phi_T}$ in accordance with the illustrative client login protocol of the present invention shown in FIG. 5.

DETAILED DESCRIPTION

Overview

Figure 1:
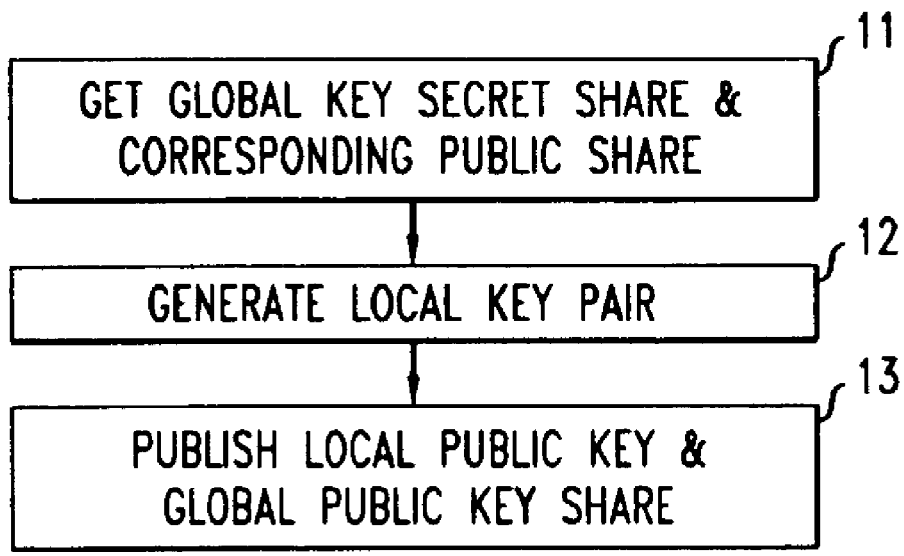
FIG. 1 shows the operation of an illustrative server setup phase in accordance with one illustrative embodiment of the present invention.

In accordance with an illustrative embodiment of the present invention, a multi-server threshold password-authenticated key exchange system is advantageously achieved by storing a semantically-secure encryption of a function of the password at the servers (instead of simply storing a one-way function of the password, as is typical in prior art systems), and then leveraging off well known solutions for distributing secret decryption keys, such as, for example, the Feldman verifiable secret sharing technique, familiar to those skilled in the art and described in P. Feldman, *A Practical Scheme for Non-Interactive Verifiable Secret Sharing,* 28th IEEE Symposium on Foundations of Computer Science, pp. 427–437, 1987 (hereinafter, "Feldman"). In other words, the problem of distributing password authentication information is advantageously transformed to the problem of distributing cryptographic keys. (In accordance with certain illustrative embodiments of the present invention, the cryptographic protocol used is based on the well known Diffie-Hellman protocol. See, for example, U.S. Pat. No. 4,200,770, entitled "Cryptographic Apparatus and Method," issued on Sep. 6, 1977 to M. Hellman et al. U.S. Pat. No. 4,200,770 is incorporated by reference herein.)

However, once this transformation is made, verifying passwords without leaking information becomes much more complex. Specifically, in accordance with one illustrative embodiment of the present invention, intricate manipulations of ElGamal encryptions and careful use of efficient non-interactive zero-knowledge proofs, each of which are familiar to those skilled in the art, are advantageously employed. See, e.g., T. ElGamal, *A Public Key Cryptosystem and a Signature Scheme Based on Discrete Logarithm*, IEEE Transactions on Information Theory, 31:469–472, 1985 (hereinafter "ElGamal"), and M. Blum, A. DeSantis, S. Micali and G. Persiano, *Noninteractive Zero-Knowledge*, Siam Journal on Computing, Vol. 20, No. 6, pp. 1084–1118, December, 1991 (hereinafter "Blum et al."), respectively, each of which is incorporate by reference herein.

Model

Specifically, the following description of an illustrative embodiment of the present invention is based on the model detailed in Bellare et al. This model was specifically designed for the problem of authenticated key exchange ("ake") between two parties, a client and a server. The purpose of the model is to enable the two parties to engage in a protocol such that after the protocol was completed, they would each hold a session key that is known only to the two of them.

Similarly, in accordance with the principles of the present invention, a model is advantageously designed for the problem of distributed authenticated key exchange ("dake") between a client and a plural number k of servers. In this case, the purpose of the model is to enable the parties to engage in a protocol such that after the protocol is completed, the client would advantageously hold k session keys, each one being shared with (a different) one of the k servers, such that the session key shared between the client and a given server is known only to the client and that particular server, even if up to k-1 other servers were to conspire together.

Note that a secure dake protocol allows for secure downloadable credentials, by, e.g., having the servers store an encrypted credentials file with a decryption key stored using a threshold scheme among them, and then having each send a partial decryption of the credentials file to the client, encrypted with the session key it shares with the client. Note that the credentials are secure in a threshold sense—that is, fewer than the given threshold of servers are unable to obtain the credentials.

In accordance with the principles of the invention, there are two types of protocol participants—clients and servers. Define ID=Clients∪Servers such that ID is a non-empty set of protocol participants, or "principals." Assume Servers consists of n servers, denoted $\{S_1, \ldots, S_n\}$, and that these servers are intended to cooperate in authenticating a client. (Note that it will be obvious to one of ordinary skill in the art how the instant model could be extended to have multiple sets of servers, but for clarity of presentation such a generalization will not be described herein.) Each client C∈Clients has a secret password $\pi_C$, and each server S∈Servers has a vector $\pi_S=[\pi_S[C]]_{C\in Clients}$. Entry $\pi_S[C]$ is referred to herein as the "password record." Let Password$_C$ be a (possibly small) set from which passwords for client C are selected. Assume that $$\pi_c \xleftarrow{R} \text{Password}_c,$$

although it will be obvious to those of ordinary skill in the art that the following may be easily extended to other password distributions. Clients and servers may be advantageously modeled as probabilistic polynomial-time algorithms with an input tape and an output tape.

Definitions

Let k be the cryptographic security parameter. Let $G_q \in G$ denote a finite (cyclic) group of order q, where $|q|=k$. Let g be a generator of $G_q$, and assume it is included in the description of $G_q$.

Now use (a,b)×(c,d) to mean element-wise multiplication, i.e., (ac,bd), and use $(a,b)^r$ to mean element-wise exponentiation, i.e., $(a^r,b^r)$. For a tuple V, the notation V[j] means the j'th element of V.

Now denote by Σ the set of all functions H from $\{0,1\}^*$ to $\{0,1\}^\infty$. This set is provided with a probability measure by saying that a random H from Σ assigns to each $x \in \{0,1\}^*$ a sequence of bits each of which is selected uniformly at random. As is well known to those skilled in the art, this sequence of bits may be used to define the output of H in a specific set, and thus it may be assumed that one can specify that the output of a random oracle H be interpreted as a (random) element of $G_q$. (Note, for example, that this can be easily defined when $G_q$ is a q-order subgroup of $Z_p^*$; where q and p are prime.) Access to any public random oracle H∈Ω is given to all algorithms; specifically, it is given to the protocol P and to the adversary (i.e., it is public). Assume that secret session keys are drawn from $\{1,0\}^k$.

An Illustrative Protocol in Accordance with the Present Invention

The following describes in detail a protocol for threshold password-authenticated key exchange in accordance with an illustrative embodiment of the present invention. The illustrative protocol in its entirety consists of three separate phases:

(A) a server setup phase, in which each of the multiple servers generate appropriate cryptographic keys for use by the client;

(B) a client setup phase, in which the client creates a ciphertext encryption based on the password and transmits it to each of the servers; and (C) the client login protocol phase—which itself comprises both client activity and server activity—in which the client's password is submitted to the servers for authentication and authenticated by the servers.

Each of these phases will be described in detail below.

An Illustrative Server Setup Phase According to One Embodiment of the Invention Assume that there are n servers $\{S_i\}_{i \in \{1, 2, \ldots, n\}}$. Let (x,y) be the servers' "global" key pair such that $y=g^x$. In accordance with the principles of the present invention and according to one illustrative embodiment of the present invention, the servers advantageously share the global secret key x using a (k,n)-threshold Feldman secret sharing protocol, fully familiar to those of ordinary skill in the art. (See, e.g., Feldman, cited above.) Specifically, a polynomial $$f(z) = \sum_{j=0}^{k-1} a_j z^j$$

mod q is chosen with $a_0 \leftarrow x$ and random coefficients $$a_j \xleftarrow{R} Z_q$$

for j>0. Then each server $S_i$ gets a secret share $x_i = f(i)$ and a corresponding public share $y_i = g^{x_i}$, $1 \leq i \leq n$. (It will be assumed herein that a trusted dealer generates these shares, but it will be obvious to those skilled in the art that it is also possible to have the servers generate them using, for example, a distributed protocol.) In addition, each server $S_i$ independently generates its own "local" key pair $(x'_i, y'_i)$ such that $y'_i = g^{x'_i}$, $1 \leq i \leq n$. Each server $S_i$ then publishes its "local public key" $y'_i$ along with its share of the global public key $y_i$. Also, let $$H_0, H_1, H_2, H_3, H_4, H_5, H_6 \xleftarrow{R} \Omega$$

be random oracles with domain and range defined by the context of their use. Let $h \leftarrow H_0(y)$ and $h' \leftarrow H_1(y)$ be generators for $G_q$. ($H_2$ through $H_6$ will be used below.)

Note that in accordance with the illustrative embodiment of the present invention described herein, the servers are assumed to have (securely) stored the 2n+1 public values $$y, \{y'_i\}_{i=1}^n, \text{ and } \{y_i\}_{i=1}^n.$$

Likewise, the client is assumed herein to have (securely) stored the n+1 public values y and $$\{y'_i\}_{i=1}^n.$$

However, in accordance with other illustrative embodiments of the present invention, a trusted certification authority (CA) could certify these values. The details of such an alternative approach will be obvious to those of ordinary skill in the art.

FIG. 1 shows the operation of an illustrative server setup phase in accordance with one illustrative embodiment of the present invention. As shown in the figure, block 11 gets the global key secret share $(x_i)$ and the corresponding public share $(y_i)$ for the given server (i); block 12 generates the local key pair $(x'_i, y'_i)$; and block 13 publishes the local public key $(y'_i)$ and its global public key share $(y_i)$.

An Illustrative Client Setup Phase According to One Embodiment of the Invention Assume that a client C∈Clients has a secret password $\pi_C$ drawn from a set Password$_C$. It may be further assumed herein that Password$_C$ can be mapped into $Z_q$. In accordance with one illustrative embodiment of the present invention, C advantageously creates an ElGamal ciphertext encryption (fully familiar to those skilled in the cryptographic art—see ElGamal, cited above), $E_C$ of the value $g^{(\pi_C)^{-1}}$, using the servers' global public key y. More precisely, C randomly selects $$\alpha \xleftarrow{R} Z_q$$

and computes $E_C \leftarrow (y^\alpha g^{(\pi_C)^{-1}}, g^\alpha)$. Then, C sends $E_C$ to each of the servers $S_i$, $1 \leq i \leq n$, each of which advantageously records (C, $E_C$) in their database. (In accordance with an alternative illustrative embodiment of the present invention, a trusted Certification Authority (CA) could be used. The additional details of such an embodiment will be obvious to those skilled in the art.)

Note that it is to be assumed herein that any adversary (i.e., attacker) does not observe or participate in either the system or client setup phases. It may also be assumed that the client saves a copy of $E_C$. Alternatively, the client could obtain a copy through interaction with the servers, and if so, it could be certified in some way, either by a trusted CA or by some type of server signatures. Again, the additional details of such an embodiment will be obvious to those skilled in the art.

Figure 2:
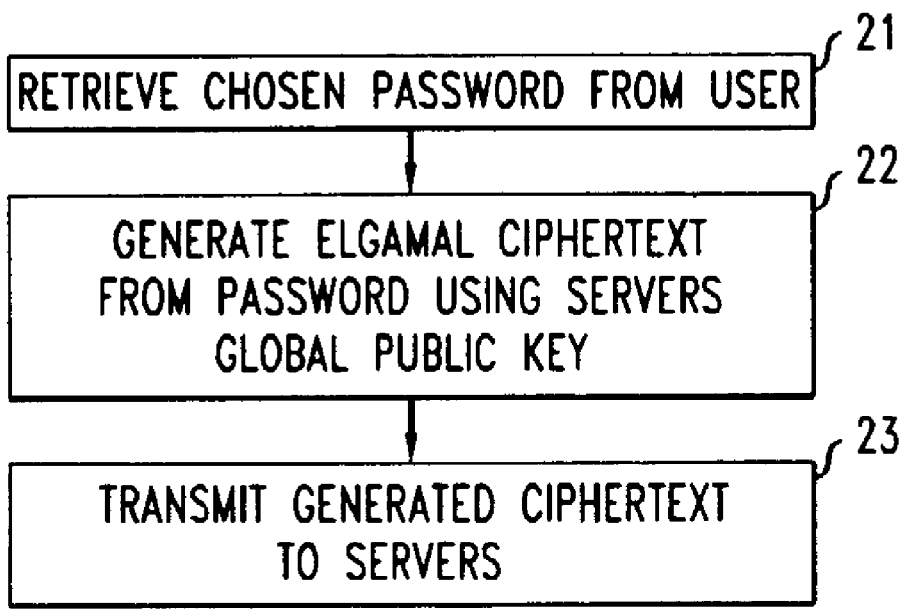
FIG. 2 shows the operation of an illustrative client setup phase in accordance with one illustrative embodiment of the present invention.

FIG. 2 shows the operation of an illustrative client setup phase in accordance with one illustrative embodiment of the present invention. As shown in the figure, block 21 retrieves the password that the user chooses; block 22 generates the ElGamal ciphertext encryption ($E_C$) as described above; and block 23 transmits the generated ciphertext encryption to the servers.

Figure 3:
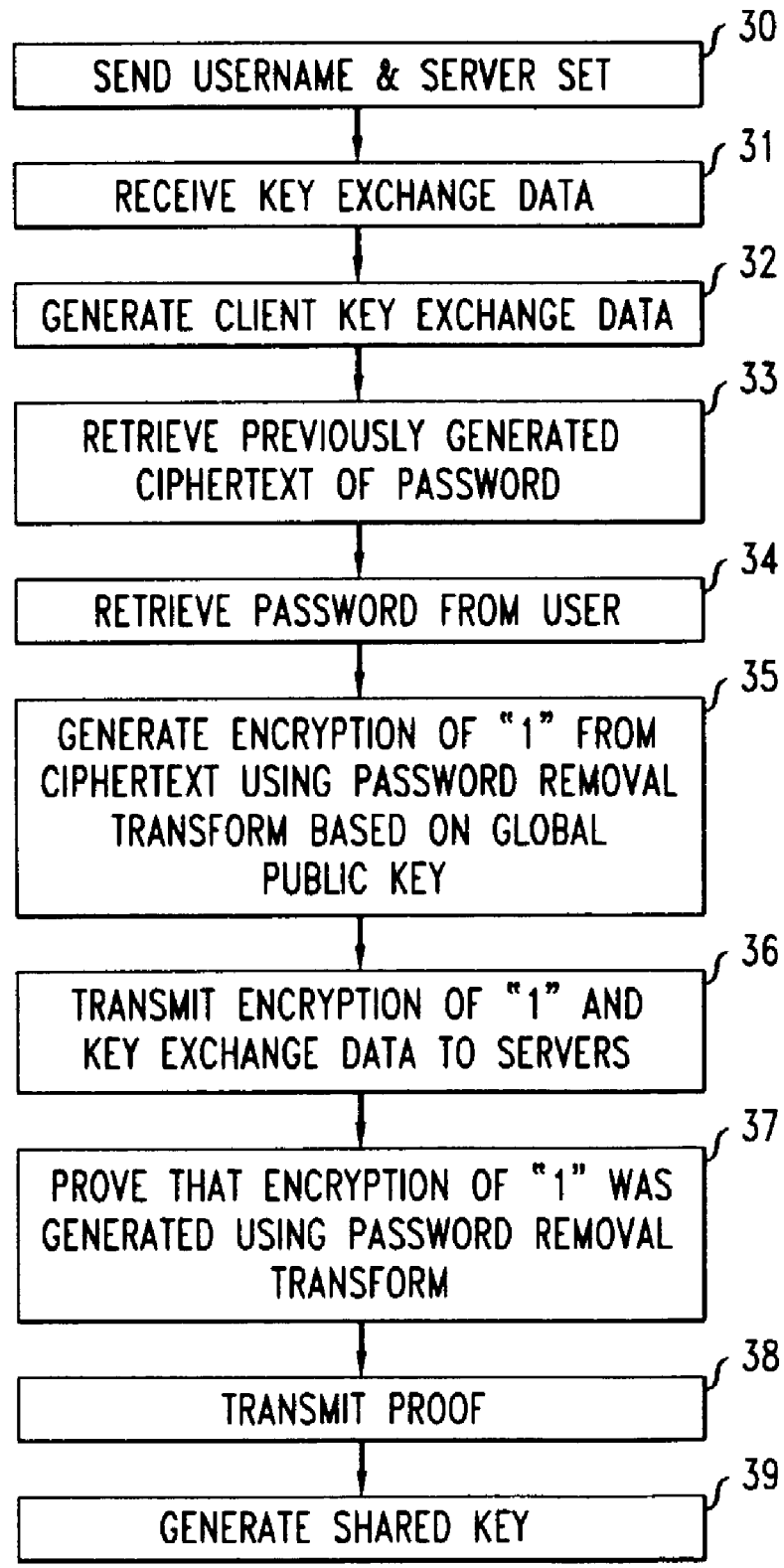
FIG. 3 shows the operation of the client activity associated with an illustrative client login protocol phase in accordance with one illustrative embodiment of the present invention.
Figure 4:
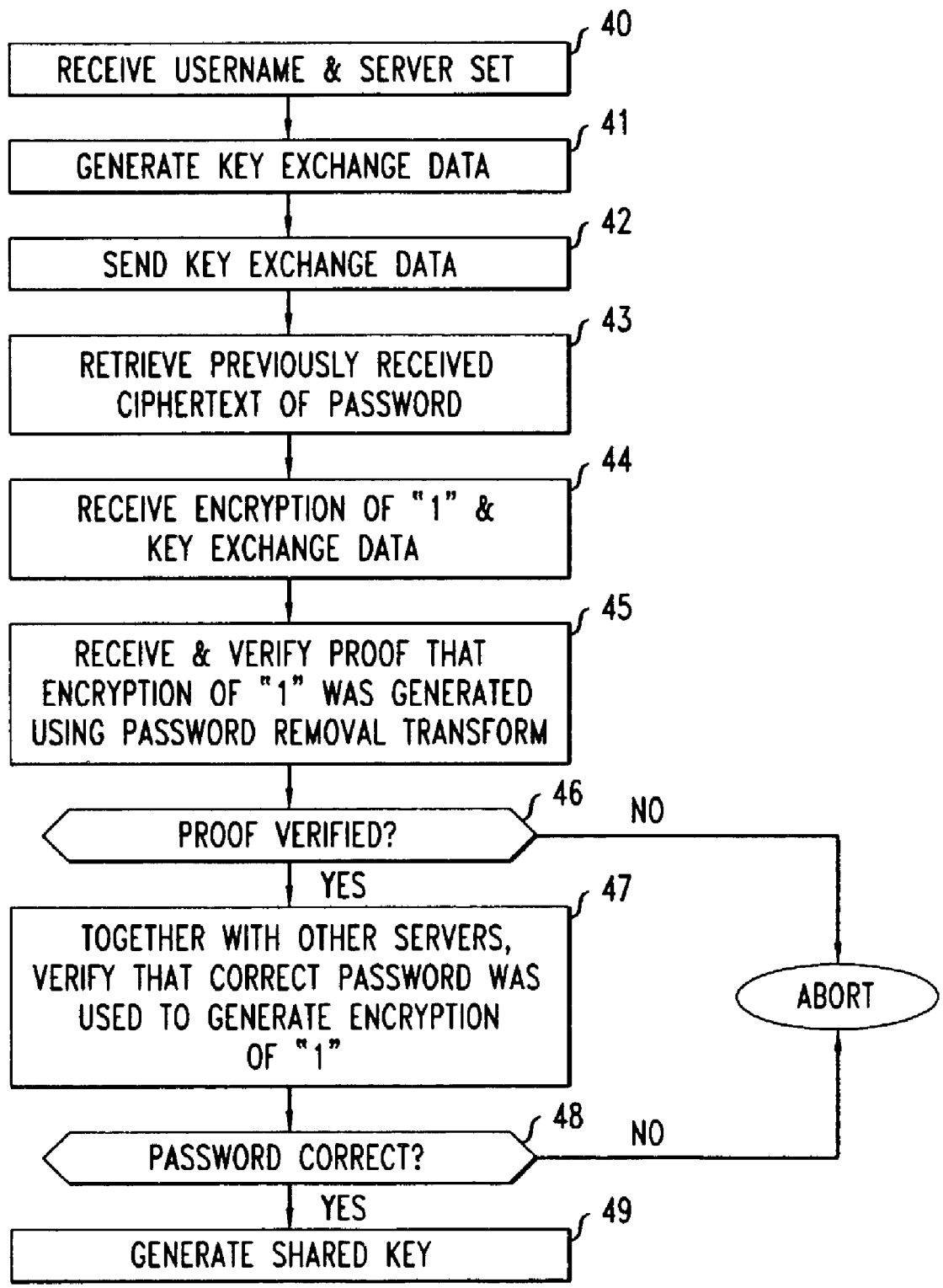
FIG. 4 shows the operation of the server activity associated with an illustrative client login protocol phase in accordance with one illustrative embodiment of the present invention.

An Illustrative Client Login Protocol According to an Embodiment of the Invention Once the setup phases have been completed in the above described manner, the client is advantageously able to "login" (i.e., submit the password for authentication) in accordance with an illustrative embodiment of the present invention. FIG. 3 shows the operation of the client activity associated with an illustrative client login protocol phase in accordance with one illustrative embodiment of the present invention, and FIG. 4 shows the operation of the server activity associated with an illustrative client login protocol phase in accordance with one illustrative embodiment of the present invention. Each of these figures will be described below.

In particular, the above described illustrative protocol advantageously makes use of a simulation-sound non-interactive zero-knowledge proof (SS-NIZKP) scheme, which schemes are fully familiar to those of ordinary skill in the art, in order to provide the "proof" described above. (See Blum et al., cited above.) More particularly, in accordance with the illustrative embodiment of the present invention, the protocol for a client C∈Clients employs an SS-NIZKP scheme with a "prove" function $\text{Prove}_{\Phi_Q}$ and a "verify" function $\text{Verify}_{\Phi_Q}$, over a language defined by a predicate $\Phi_Q$ that takes elements of $\{0,1\}^* \times (G_q \times G_q)^3$. (The use of "prove" and "verify" functions in connection with an SS-NIZKP is fully familiar to those skilled in the art.) Specifically, the predicate $\Phi_Q$ is defined as $$\Phi_Q(\tau, E_C, B, V) = \exists \beta, \pi, \gamma : (B = (y^\beta, g^\beta) \times (E_C)^\pi \times (g^{-1}, 1)$$

and $$(V = (h^\gamma g^\pi, g^\gamma)).$$

The algorithms $\text{Prove}_{\Phi_Q}$ and $\text{Verify}_{\Phi_Q}$ advantageously use a random oracle $H_3$. $\text{Prove}_{\Phi_Q}$ may be implemented in a conventional manner as a three-move honest-verifier proof made non-interactive by using the hash function to generate the verifier's random challenge, and having τ be an extra input to the hash function. Such an implementation will be obvious to those skilled in the art. (Note that other proof functions which are defined below may be implemented in a similar manner.)

FIG. 5 shows the detailed operation of the illustrative client login protocol in accordance with the illustrative embodiment of the present invention as shown in FIGS. 3 and 4, specifying the detailed operation of both the client and each of the servers in accordance therewith. Specifically, as can be seen in the figure, the client C∈Clients receives a set I of k servers in Servers and initiates the protocol with that set, by broadcasting I along with its own identity C. (Note that aggregation and broadcast functionalities for the communication between the client and the servers, as well as among the servers themselves, are assumed.)

In return, C receives nonces from the servers in I. Then, in accordance with the principles of the present invention, the client advantageously "removes" the password from the ciphertext encryption $E_C$ by raising it to $\pi_C$ and dividing g out of the first element of the tuple, and then re-blinds the result to form B. (Note that "removing the password" as used herein means that a mathematical operation is performed such that the result is mathematically independent of the value of the password. Such a procedure will be referred to herein as a "password removal transform.") The quantity V is then formed to satisfy the predicate $\Phi_Q$, and an SS-NIZKP σ is created, with use of the function $\text{Prove}_{\Phi_Q}$, to bind B,V, the session public key ỹ, and the nonces from the servers (the latter two of which have been combined into τ). This SS-NIZKP also forces the client to behave properly (i.e., in a way that allows a simulator in the proof of security to operate correctly). FIG. 6 shows the detailed operation of the function $\text{Prove}_{\Phi_Q}$ in accordance with the illustrative client login protocol of the present invention shown in FIG. 5.

Each of the servers then proceed to verify the SS-NIZKP by executing the function $\text{Verify}_{\Phi_Q}$. Specifically, this step verifies that σ was in fact generated using the password removal transform. FIG. 7 shows the detailed operation of the function $\text{Verify}_{\Phi_Q}$ in accordance with the illustrative client login protocol of the present invention shown in FIG. 5.

Now, note that if the client has in fact used the password $\pi = \pi_C$, it will necessarily be the case that $B[1] = y^{\beta+\alpha\pi}$ and $B[2] = g^{\beta+\alpha\pi}$. Thus, the servers next execute the function $\text{DistVerify}(\tau, B, V)$ to verify that $\log_g y = \log_{B[2]} B[1]$. (See FIG. 8 and the detailed description of DistVerify below.) In effect, this is verifying (without decryption) that B is a valid encryption of the plaintext message "1". Each server $S_i$ then computes a session key $K_i$, which has also been computed by the client.

Note that the illustrative protocol as specified does not provide forward security. However, in accordance with another illustrative embodiment of the present invention, forward security may be advantageously achieved by having each server $S_i$ generate its Diffie-Hellman values dynamically, rather than by just using $y'_i$. Then, these values would be advantageously certified by $S_i$ to protect the client against a man-in-the-middle attack. The details will be clear to those skilled in the art.

FIG. 8 shows the detailed operation of the function DistVerify in accordance with the illustrative client login protocol of the present invention shown in FIG. 5. The DistVerify portion of the illustrative protocol in accordance with the illustrative embodiment of the present invention takes three parameters, τ, B, and V, and is executed by the servers $\{S_i\}_{i \in I}$ to verify that $\log_g y = \log_{B[2]} B[1]$, i.e., that B is in fact an encryption of "1". (Note that the parameter V is advantageously included in order to allow a proof of security, and thus may be omitted in other illustrative embodiments of the present invention.) Note that the DistVerify function uses a conventional notation for Lagrange coefficients:

$$\lambda_{j,I} = \prod_{l \in I \setminus \{j\}} \frac{-l}{j-l} \mod q.$$

The DistVerify portion of the illustrative protocol operates as follows. First the servers distributively compute $B^r$, thereby randomizing the quotient $B[1]/(B[2])^x$ if it is not equal to 1. Then they take the second component (i.e., $(B[2])^r$) and distributively compute $((B[2])^r)^x$ using their shared secrets. Finally they verify that $((B[2])^r)^x = (B[1])^r)$, implying that $B[1] = (B[2])^x$, and hence that B is in fact an encryption of 1. The protocol advantageously makes use of three SS-NIZKP schemes as follows:

1. An SS-NIZKP scheme with a "prove" function $\text{Prove}_{\Phi_R}$ and a "verify" function $\text{Verify}_{\Phi_R}$, over a language defined by a predicate $\Phi_R$ that takes elements of $Z \times (G_q \times G_q)^6$ and is defined as $$\Phi_R(i, B, V, B_i, V_i, V'_i, V''_i) = \exists r_i, r'_i, \gamma_i, \gamma'_i, \gamma''_i : B_i = B^{r_i} \times (y, g)^{r'_i}$$

and $$V_i = (h^{\gamma_i} g^{r_i}, g^{\gamma_i})$$

and $$V'_i = (h^{\gamma'i}(V[1])^{r_i} g^{65 \, i})$$

and $$V''_i = (h^{\gamma''i}(V[2])^{r'i}, g^{\gamma''i}).$$

The algorithms Prove$_{\Phi_R}$ and Verify$_{\Phi_R}$ advantageously use a random oracle H$_4$. FIG. 9 shows the detailed operation of the function Prove$_{\Phi_R}$, and FIG. 10 shows the detailed operation of the function Verify$_{\Phi_R}$, each in accordance with the illustrative client login protocol of the present invention shown in FIG. 5.

2. An SS-NIZKP scheme with a "prove" function Prove$_{\Phi_S}$ and a "verify" function Verify$_{\Phi_S}$, over a language defined by a predicate $\Phi_S$ that takes elements of Z×{0,1}*×G$_q$×(G$_q$× G$_q$) and is defined as $$\Phi_S(i,\tau',C_i,R_i) = \exists \alpha,\gamma : C_i = g^{60}$$

and $$R_i = (h^\gamma (h')^\alpha, g^\gamma).$$

The algorithms Prove$_{101_S}$ and Verify$_{\Phi_S}$ advantageously use a random oracle H$_5$. FIG. 11 shows the detailed operation of the function Prove$_{\Phi_S}$, and FIG. 12 shows the detailed operation of the function Verify$_{\Phi_S}$, each in accordance with the illustrative client login protocol of the present invention shown in FIG. 5.

3. An SS-NIZKP scheme with a "prove" function Prove$_{\Phi_T}$ and a "verify" function Verify$_{\Phi_T}$, over a language defined by a predicate $\Phi_T$ that takes elements of Z×{0,1}*×G$_q$×G$_q$× G$_q$×(G$_q$×G$_q$) and is defined as $$\Phi_T(i,\tau',\bar{g},\bar{C_i},C_i,R_i) = \exists \alpha,\gamma : \bar{C_i} = \bar{g}^\alpha$$

and $$C_i = g^\alpha$$

and $$R_i = (h^\gamma (h')^\alpha, g^\gamma).$$

The algorithms Prove$_{\Phi_T}$ and Verify$_{\Phi_T}$ advantageously use a random oracle H$_6$. FIG. 13 shows the detailed operation of the function Prove$_{\Phi_T}$, and FIG. 14 shows the detailed operation of the function Verify$_{\Phi_T}$, each in accordance with the illustrative client login protocol of the present invention shown in FIG. 5.

Specifically, referring back to FIG. 3, the client activity for the illustrative client login protocol proceeds as follows. As shown in the figure, in block 30, the client sends the username of the client (C) to the servers and also identifies the set of servers (I=<i$_1$, . . . , i$_k$>) to each individual server. In block 31, the client receives the key exchange data from the servers and in block 32, generates the client key exchange data. Then, in block 33, the client retrieves the ElGamal ciphertext encryption of the user's password (E$_C$) that was previously generated by the client, and in block 34, retrieves the password itself (π) from the user.

Next, in accordance with an illustrative embodiment of the present invention, in block 35, the client generates, from the ciphertext encryption of the password, an encryption of "1" (B) from the ciphertext encryption using a password removal transform, where the encryption is advantageously based on the global public key. Then, in block 36, the client transmits this encryption of "1" (B) along with the key exchange data to the servers. In block 37, the client generates a "proof" (Prove$_{\Phi_Q}$) that the encryption of "1" was, in fact, generated using the password removal transform, and in block 38, the client transmits that proof (as σ) to the servers. Finally, in block 39, the client generates the shared keys (K$_i$) for communication with each of the servers (assuming, of course, that the authentication of the client succeeds).

Now, referring back to FIG. 4, the server activity for the illustrative client login protocol proceeds as follows. (Note that in accordance with the illustrative embodiment of the present invention, the procedure of FIG. 4 is advantageously performed by each of the multiple servers concurrently.) In block 40, the server receives the username (C) and the identification of the server set (I=<i$_1$, . . . , i$_k$>) Then, in block 41, each server generates its key exchange data (C$_i$) and in block 42 transmits that data to the client. And in block 43, the server retrieves the previously received (and stored) ElGamal ciphertext encryption of the password (E$_C$).

Then, in accordance with an illustrative embodiment of the present invention, in block 44 each server receives the encryption of "1" (B) along with the key exchange data as sent by the client. And in block 45, each server receives the proof (σ) sent by the client and then attempts to "verify" the proof (i.e., verify that the encryption was in fact generated with use of the password removal transform) by executing the function Verify$_{\Phi_Q}$. If this verification fails (as tested by decision block 46), the password authentication is advantageously aborted. Otherwise, in block 47, the servers jointly operate to verify that the encryption was generated with use of the proper password (i.e., that the encryption is in fact a valid encryption of the plaintext message "1"). If this verification fails (as tested by decision block 48), the password authentication is also advantageously aborted. Otherwise, and finally, in block 49, each of the servers generates the shared keys (K$_i$) for communication with the client.

An Illustrative Hardware Architecture According to One Illustrative Embodiment

Figure 15:
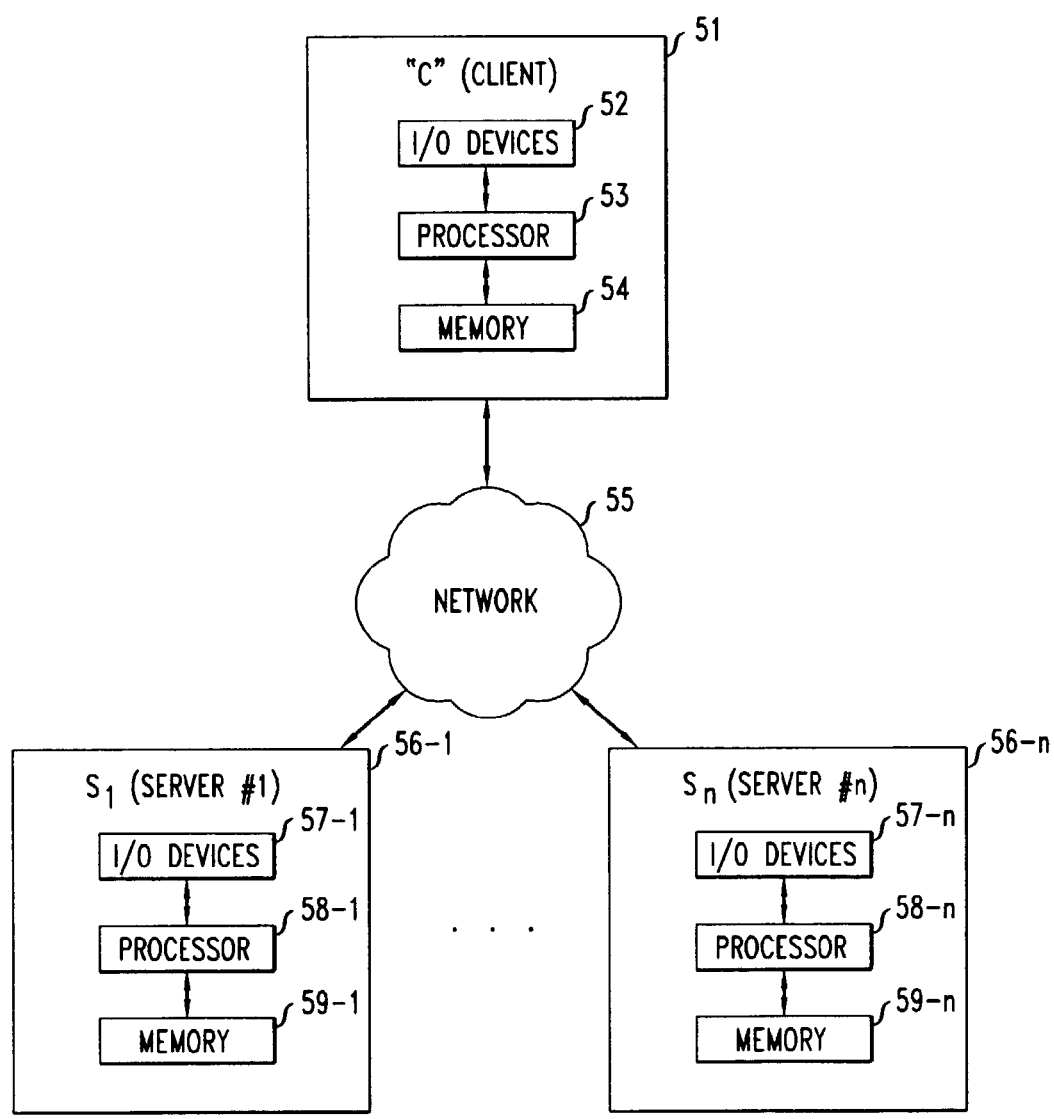
FIG. 15 shows a generalized hardware architecture of a data network and computer systems suitable for implementing a multi-server threshold password-authenticated key exchange system in accordance with an illustrative embodiment of the present invention.

FIG. 15 shows a generalized hardware architecture of a data network and computer systems suitable for implementing a multi-server threshold password-authenticated key exchange system in accordance with an illustrative embodiment of the present invention. The environment shown in the figure includes a client system 51 (which illustratively includes input/output devices 52, processor 53, and memory 54) and a plurality of server systems 56-1 through 56-n (which illustratively include input/output devices 57-1 through 57-n, processors 58-1 through 58-n, and memories 59-1 through 59-n, respectively). The client system and each of the server systems are illustratively interconnected through network 55. In accordance with an illustrative embodiment of the present invention, processor 53 of client system 51 illustratively executes the procedures shown in FIGS. 2 and 3 as described above, while processors 58-1 through 58-n of each of servers 56-1 through 56-n, respectively, illustratively executes the procedures shown in FIGS. 1 and 4 as described above.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

We claim:

1. A method for providing information representative of a password from a client to a plurality of servers, the method performed in preparation for subsequent password authentication of the password by one or more of the plurality of servers, each of the plurality of servers having a share of a secret key, the secret key having a public key associated therewith, the method performed by the client and comprising the steps of:

generating an encryption of a function of the password, the encryption based on the public key; and communicating the encryption to each server in said plurality of servers for use in said subsequent password authentication.

2. The method of claim 1 wherein the encryption is based on an ElGamal ciphertext of a function of the password.

3. The method of claim 2 wherein the function is $g^{(\pi_C)^{-1}}$ where $\pi_C$ is the password and g is a cryptographic key generator, the cryptographic key generator g having been used to generate cryptographic keys provided for communication between the client and the plurality of servers.

4. The method of claim 3 wherein the encryption comprises the tuple $(y^\alpha g^{(\pi_C)^{-1}}, g^\alpha)$ where y is the public key and $\alpha$ is a randomly chosen value.

5. The method of claim 2 wherein the function is the identity function and the encryption is based on an ElGamal ciphertext of the password itself.

6. A method for storing information representative of a password, the method performed in preparation for subsequent password authentication between a client and a plurality of servers, each of the plurality of servers having a share of a secret key, the secret key having a public key associated therewith, the method performed by one of said servers and comprising the steps of:

receiving from said client an encryption of a function of the password, the encryption based on the public key; and storing said encryption for use in said subsequent password authentication.

7. The method of claim 6 wherein the encryption is based on an ElGamal ciphertext of a function of the password.

8. The method of claim 7 wherein the function is $g^{(\pi_C)^{-1}}$, where $\pi_C$ is the password and g is a cryptographic key generator, the cryptographic key generator g having been used to generate cryptographic keys provided for communication between the client and the plurality of servers.

9. The method of claim 8 wherein the encryption comprises the tuple $(y^\alpha g^{(\pi_C)^{-1}}, g^\alpha)$, where y is the public key and $\alpha$ is a randomly chosen value.

10. The method of claim 6 wherein the function is the identity function and the encryption is based on an ElGamal ciphertext of the password itself.

* * * * *